US012671757B2

(12) United States Patent
Wang

(10) Patent No.: US 12,671,757 B2
(45) Date of Patent: *Jun. 30, 2026

(54) SUPPORT STRUCTURE, FLEXIBLE DISPLAY PANEL, AND ELECTRONIC DEVICE

(71) Applicant: Wuhan China Star Optoelectronics Semiconductor Display Technology Co., Ltd., Wuhan (CN)

(72) Inventor: Wenqiang Wang, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 927 days.

This patent is subject to a terminal disclaimer.

(21) Appl. No.: 17/263,577

(22) PCT Filed: Nov. 17, 2020

(86) PCT No.: PCT/CN2020/129345
§ 371 (c)(1),
(2) Date: Jun. 19, 2023

(87) PCT Pub. No.: WO2022/077690
PCT Pub. Date: Apr. 21, 2022

(65) Prior Publication Data
US 2024/0205317 A1 Jun. 20, 2024

(30) Foreign Application Priority Data
Oct. 13, 2020 (CN) .......................... 202011089025.5

(51) Int. Cl.
*H04M 1/02* (2006.01)

(52) U.S. Cl.
CPC ....... *H04M 1/0268* (2013.01); *H04M 1/0214* (2013.01)

(58) Field of Classification Search
CPC ... H04M 1/0268; H04M 1/0214; G09F 9/301;
G09F 9/33
See application file for complete search history.

(56) References Cited

U.S. PATENT DOCUMENTS 11,770,907 B2 * 9/2023 Wang ..................... B32B 15/04
428/136
12,080,197 B2 * 9/2024 Chen ..................... G06F 1/1601
(Continued)

FOREIGN PATENT DOCUMENTS

CN 110062077 7/2019
CN 110062077 A * 7/2019 .......... H04M 1/0268
(Continued)

OTHER PUBLICATIONS

CN110062077A Translation (Year: 2019).*

*Primary Examiner* — George Eng

(57) ABSTRACT

A support structure, a flexible display panel, and an electronic device are provided. By reasonably providing a corresponding strip hollow structure and a circular hollow structure in a bending area, concentrated local stress can be dispersed, bending performance of the support structure can be improved, and it is able to adapt to different bending radii. In addition, ductility is improved, and coordination of deformation between a support layer and a film layer of the flexible display panel and the electronic device is ensured.

19 Claims, 8 Drawing Sheets

(56)      References Cited

U.S. PATENT DOCUMENTS

| | | | | |
|---|---|---|---|---|
| 12,089,484 | B2 * | 9/2024 | Xiong | H10K 77/111 |
| 12,133,347 | B2 * | 10/2024 | Wang | H05K 5/04 |
| 12,133,451 | B2 * | 10/2024 | Choi | B32B 27/283 |
| 2019/0259310 | A1 | 8/2019 | Ha et al. | |
| 2021/0165454 | A1 * | 6/2021 | Dong | G06F 1/1652 |

FOREIGN PATENT DOCUMENTS

| | | |
|---|---|---|
| CN | 110428735 | 11/2019 |
| CN | 110992828 | 4/2020 |
| CN | 111430437 | 7/2020 |
| CN | 211481295 | 9/2020 |

* cited by examiner

SUPPORT STRUCTURE, FLEXIBLE DISPLAY PANEL, AND ELECTRONIC DEVICE

RELATED APPLICATIONS

This application is a National Phase of PCT Patent Application No. PCT/CN2020/129345 having International filing date of Nov. 17, 2020, which claims the benefit of priority of Chinese Patent Application No. 202011089025.5 filed on Oct. 13, 2020. The contents of the above applications are all incorporated by reference as if fully set forth herein in their entirety.

FIELD AND BACKGROUND OF THE INVENTION

This application relates to the field of display technology, in particular to the field of flexible display technology, and specifically relates to a support structure, a flexible display panel, and an electronic device.

Organic light-emitting diode (OLED) display technology has developed into a mature technology, and OLED modular stacking structure based on an original technology of light-emitting diodes (LEDs) effectively reduces an overall thickness of the modular stacking structure. A thickness of the OLED module can be made less than 1 mm, and it has been widely used in terminal display devices such as mobile phones and tablet computers. However, its more expensive price leads to a relatively low popularity of the product. One of the important reasons is low production yield of flexible display screens.

At present, in a manufacturing process of foldable flexible display modules, the most common phenomena are problems such as debonding, fracture, and failure between film layers of the modular stacking structure, which are main factors affecting product life and production yield.

In a manufacturing process of flexible OLED modular stacking structure, in order to ensure that the modular stacking structure has good overall flatness, a support layer made of stainless-steel plate (SUS: a stainless-steel code) is usually used as a bottom layer of the modular stacking structure. Utilizing its good flatness and non-deformation characteristics, an original softer modular stacking structure adheres to a whole structure through an adhesive layer, which improves an overall flatness of a screen module, making it easier to disassemble and assemble when a screen is assembled with a machine. An introduction of the support layer has resolved the yield problem of the modular stacking structure to a certain extent. When a thickness of the support layer is less than 30 µm, its rigidity cannot meet the demand. Therefore, the thickness of the support layer is usually designed to be above 100 µm, so that a certain rigidity can be obtained to ensure good supportability while ensuring better bendability. However, when a bendable structure of the modular stacking structure becomes more complex and a bending radius is smaller, for example, when bending a structure of drop shape or wedge shape, more stringent bending performance is required.

Since an elastic modulus of the support layer itself is more than 1000 times different from that of the adhesive layer bonded to it, and the adhesive layer is a typical viscoelastic material, a deformation between the two is inconsistent during a bending process and it is very likely to cause partial fracture of the support layer and peeling between the film layers. This phenomenon is most common in bending of the modular stacking structure of OLED with drop-shaped and wedge-shaped structures, and has always been an important factor affecting the overall yield.

SUMMARY OF THE INVENTION

The present application provides a support structure, a flexible display panel, and an electronic device, which solve the problem of poor bending performance of the support layer with a smaller bending radius.

Solution to Technical Problem

Technical Solutions

In a first aspect, the present application provides a support structure, wherein the support structure is provided with a bending area, the bending area is provided with a plurality of rows of first strip hollow structures along a bending direction; a circular hollow structure is provided between two adjacent first strip hollow structures in the same row, and the circular hollow structure is positioned between other two adjacent first strip hollow structures in adjacent rows.

Based on the first aspect, in a first implementation manner of the first aspect, the support structure further includes a second strip hollow structure; the second strip hollow structure penetrates an edge and/or a side surface of the bending area.

Based on the first implementation of the first aspect, in a second implementation manner of the first aspect, the circular hollow structure is arranged between the first strip hollow structure and the second strip hollow structure positioned in the same row.

Based on the first aspect, in a third implementation manner of the first aspect, the first strip hollow structure includes a first semicircular hollow substructure, a first elongated hollow substructure, and a second semicircular hollow substructure sequentially arranged in a length direction of the first strip hollow structure; and the first elongated hollow substructure is connected to the first semicircular hollow substructure and the second semicircular hollow substructure.

Based on the third implementation manner of the first aspect, in a fourth implementation manner of the first aspect, in the length direction, the circular hollow structure is positioned between adjacent first semicircular hollow substructures and/or adjacent second semicircular hollow substructures; and in the bending direction, the circular hollow structure is positioned between two adjacent first elongated hollow substructures in adjacent rows.

Based on the third implementation manner of the first aspect, in a fifth implementation manner of the first aspect, a radius of the circular hollow structure is equal to a radius of the first semicircular hollow substructure or a radius of the second semicircular hollow substructure.

Based on the fifth implementation manner of the first aspect, in a sixth implementation manner of the first aspect, a width of the first elongated hollow substructure is equal to a diameter of the circular hollow structure.

Based on the third implementation manner of the first aspect, in a seventh implementation manner of the first aspect, the support structure includes at least one of a first sub-feature, a second sub-feature, a third sub-feature, or a fourth sub-feature; wherein the first sub-feature is that in the length direction, a distance between the circular hollow structure and an adjacent first semicircular hollow substructure or the second semicircular hollow substructure ranges from 0.1 mm to 0.24 mm; the second sub-feature is that in the bending direction, a distance between two adjacent first elongated hollow sub-structures ranges from 0.06 mm to 0.14 mm; the third sub-feature is that a length of the first elongated hollow substructure is greater than or equal to 3 mm; and the fourth sub-feature is that a radius of the circular hollow structure is less than or equal to 0.1 mm.

Based on any of the foregoing implementation manners of the first aspect, in an eighth implementation manner of the first aspect, a preparation material of the support structure includes at least one of manganese, aluminum, or magnesium.

Based on any of the foregoing implementation manners of the first aspect, in a ninth implementation manner of the first aspect, the bending area includes a first bendable sub-area, a second bendable sub-area, and a third bendable sub-area arranged at intervals along a bending direction; a width of the second bendable sub-area along the bending direction is greater than a sum of a width of the first bendable sub-area along the bending direction and a width of the third bendable sub-area along the bending direction.

Based on the ninth implementation manner of the first aspect, in a tenth implementation manner of the first aspect, an interval distance from the second bendable sub-area to the first bendable sub-area or the third bendable sub-area is greater than a distance between two adjacent first strip hollow structures in the bending direction.

Based on the ninth implementation manner of the first aspect, in an eleventh implementation manner of the first aspect, an interval distance from the second bendable sub-area to the first bendable sub-area is equal to an interval distance from the second bendable sub-area to the third bendable sub-area.

In a second aspect, the present application provides a flexible display panel, which includes the support structure in any of the above embodiments.

Based on the second aspect, in the first embodiment of the second aspect, a tensile breaking strength of the support structure is greater than or equal to 800 MPa; and a surface flatness of the support structure is less than or equal to 0.25 mm.

In a third aspect, the present application provides an electronic device, which includes the flexible display panel described in any one of the above embodiments.

Advantages of Invention

A support structure, a flexible display panel, and an electronic device are provided. The present application can disperse the concentrated local stress and improve the bending performance of the support structure by reasonably providing a corresponding strip hollow structure and circular hollow structure in the bending area, so they can adapt to different bending radii. In addition, the ductility thereof is improved, and the coordination of the deformation between the support layer and the film layer of the flexible display panel and the electronic device is ensured. Therefore, a risk of structural fracture of the support frame and the phenomenon of debonding between film layers can be reduced.

BRIEF DESCRIPTION OF FIGURES

Brief Description of the Several Views of the Drawings

Figure 1:
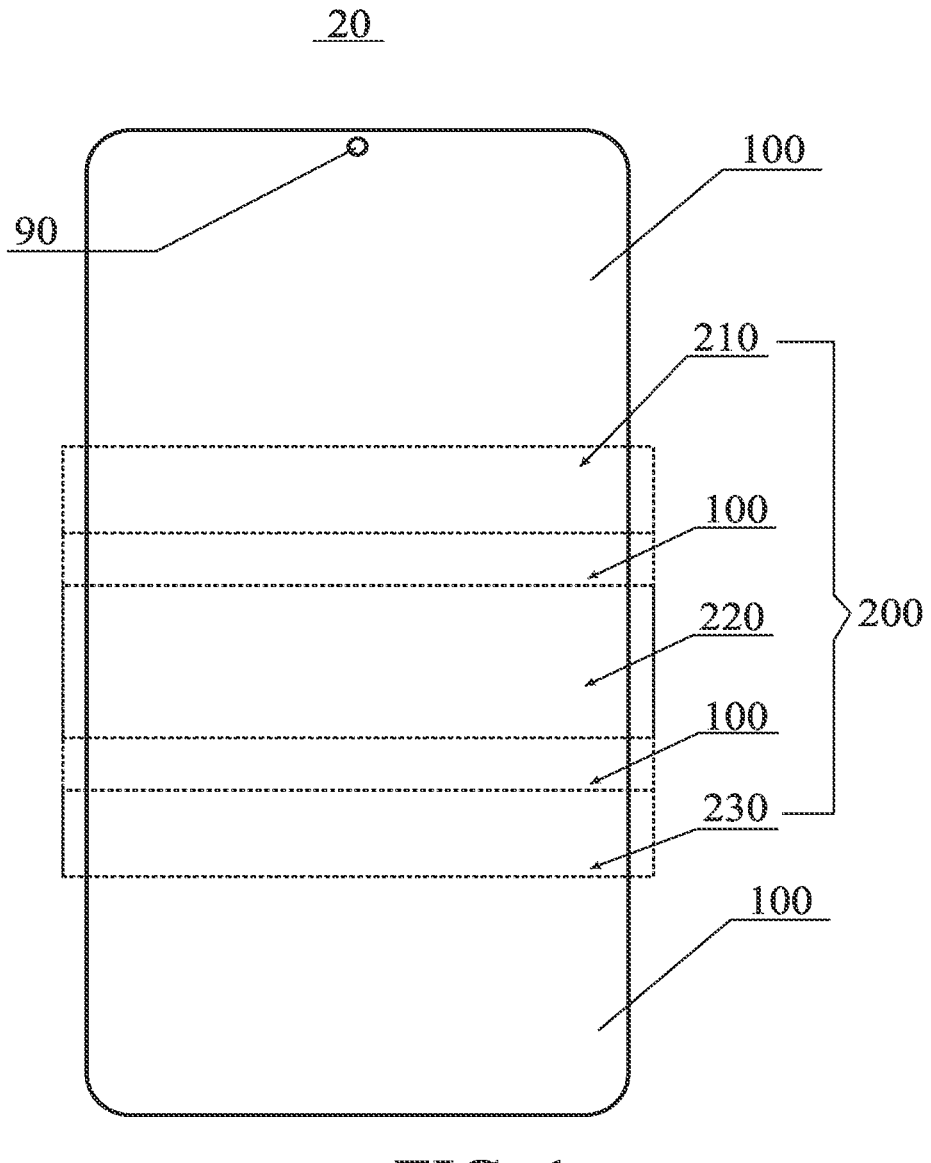

FIG. 1 is a schematic structural diagram of a support structure provided by an embodiment of the application.

Figure 2:
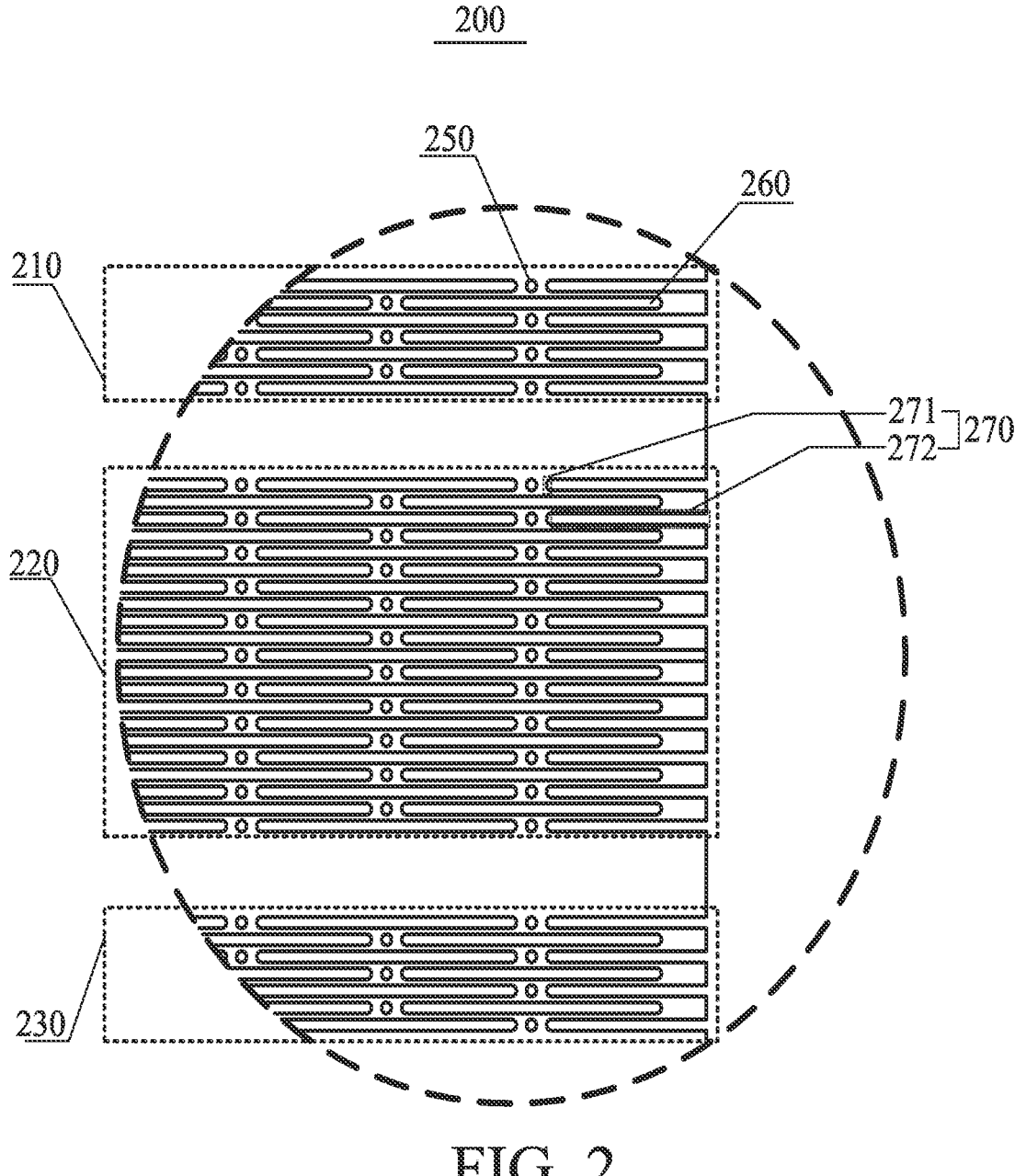

FIG. 2 is a schematic structural diagram of a bending area in FIG. 1.

Figure 3:
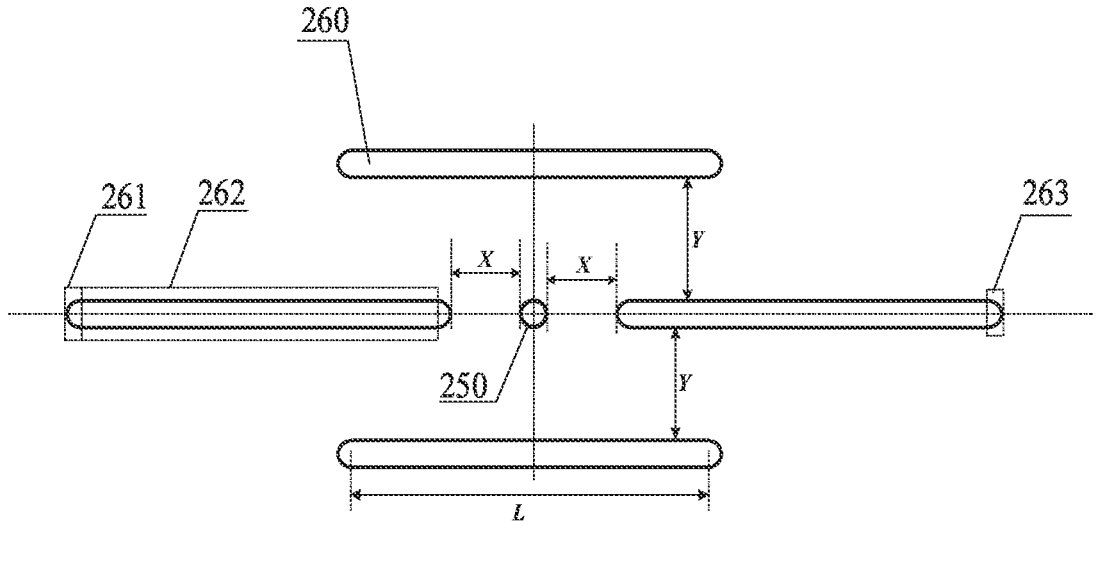

FIG. 3 is a schematic diagram of relative positions of a strip hollow structure and a circular hollow structure in FIG. 2.

Figure 4:
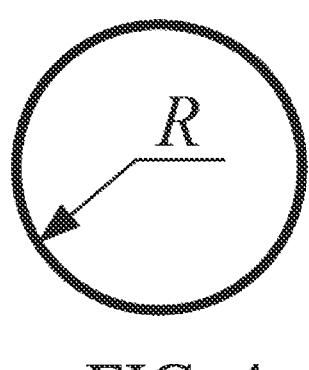

FIG. 4 is a schematic structural diagram of a circular hollow structure in FIG. 2.

Figure 5:
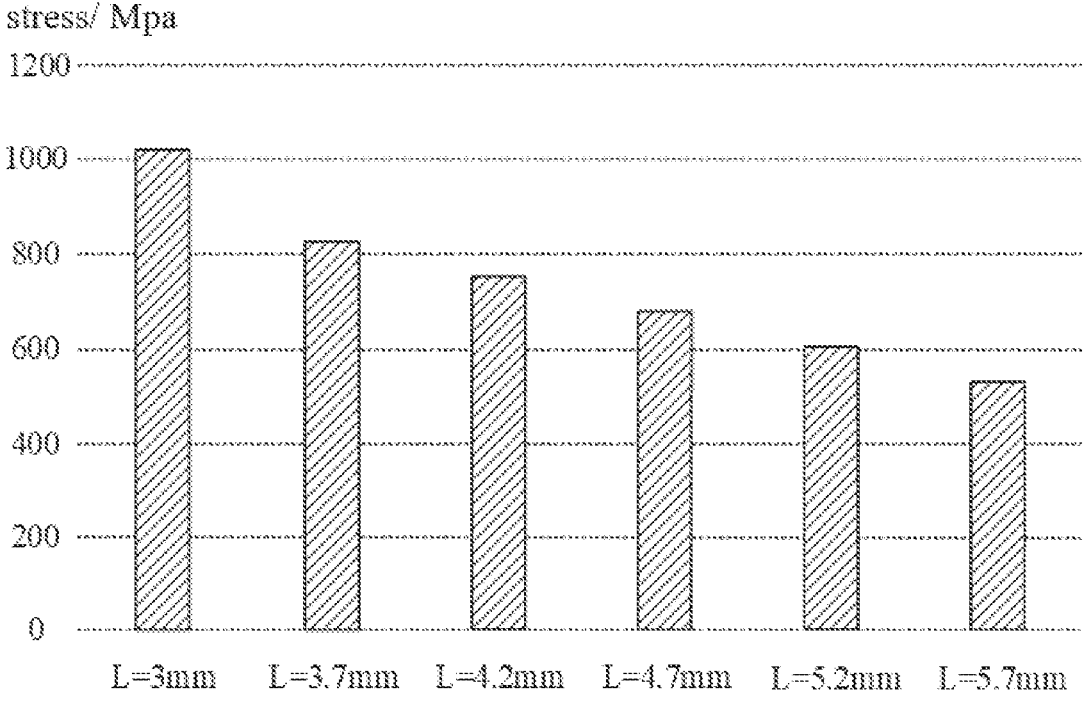

FIG. 5 is a trend chart of a relationship between a distance L and local peak stress provided by an embodiment of the application.

Figure 6:
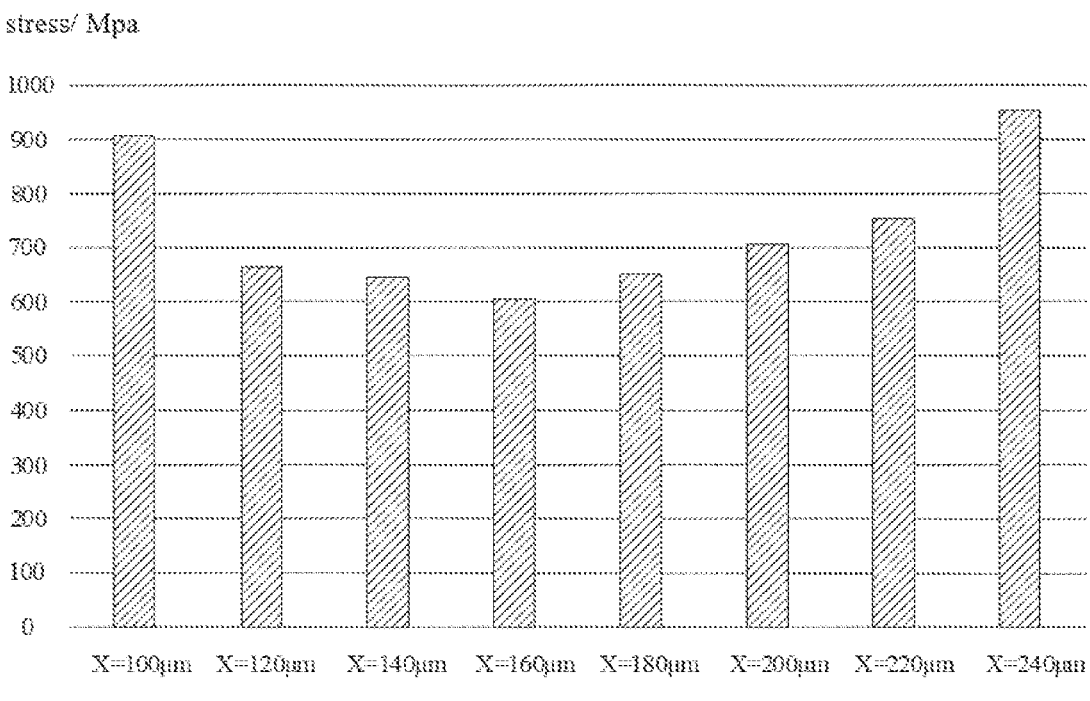

FIG. 6 is a trend chart of a relationship between a distance X and local peak stress provided by an embodiment of the application.

Figure 7:
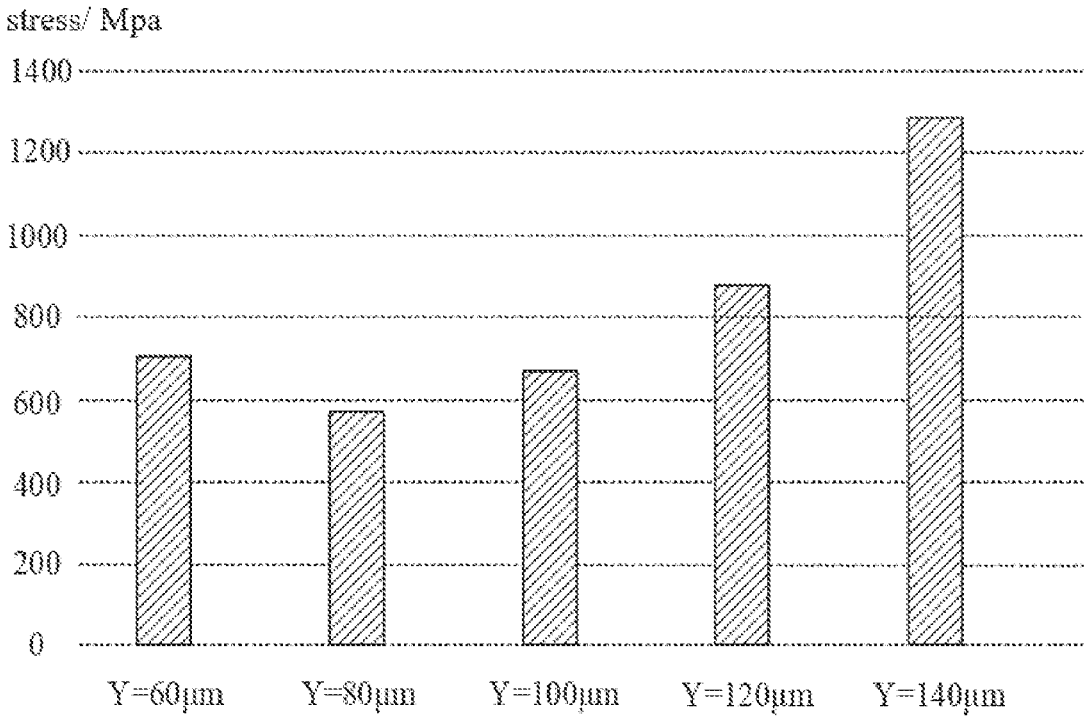

FIG. 7 is a trend chart of a relationship between a distance Y and local peak stress provided by an embodiment of the application.

Figure 8:
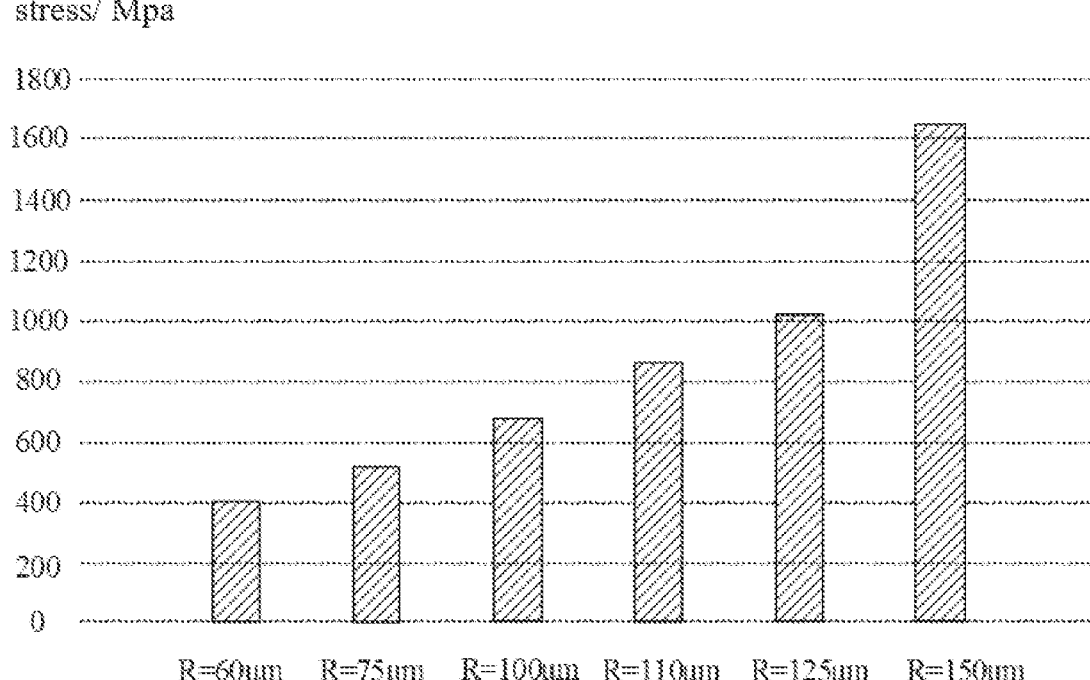

FIG. 8 is a trend chart of a relationship between a radius R and local peak stress provided by an embodiment of the application.

Figure 9:
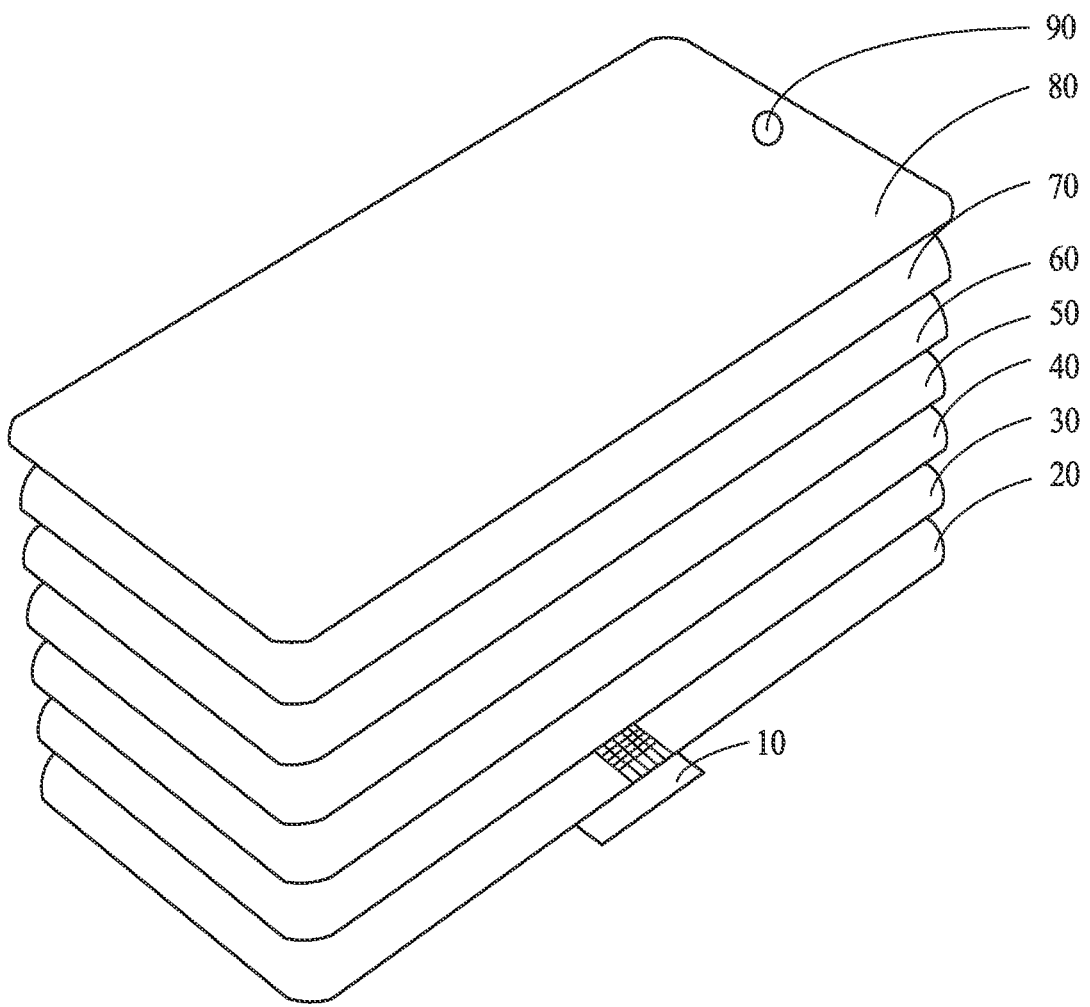

FIG. 9 is a schematic structural diagram of a flexible display panel provided by an embodiment of the application.

Figure 10:
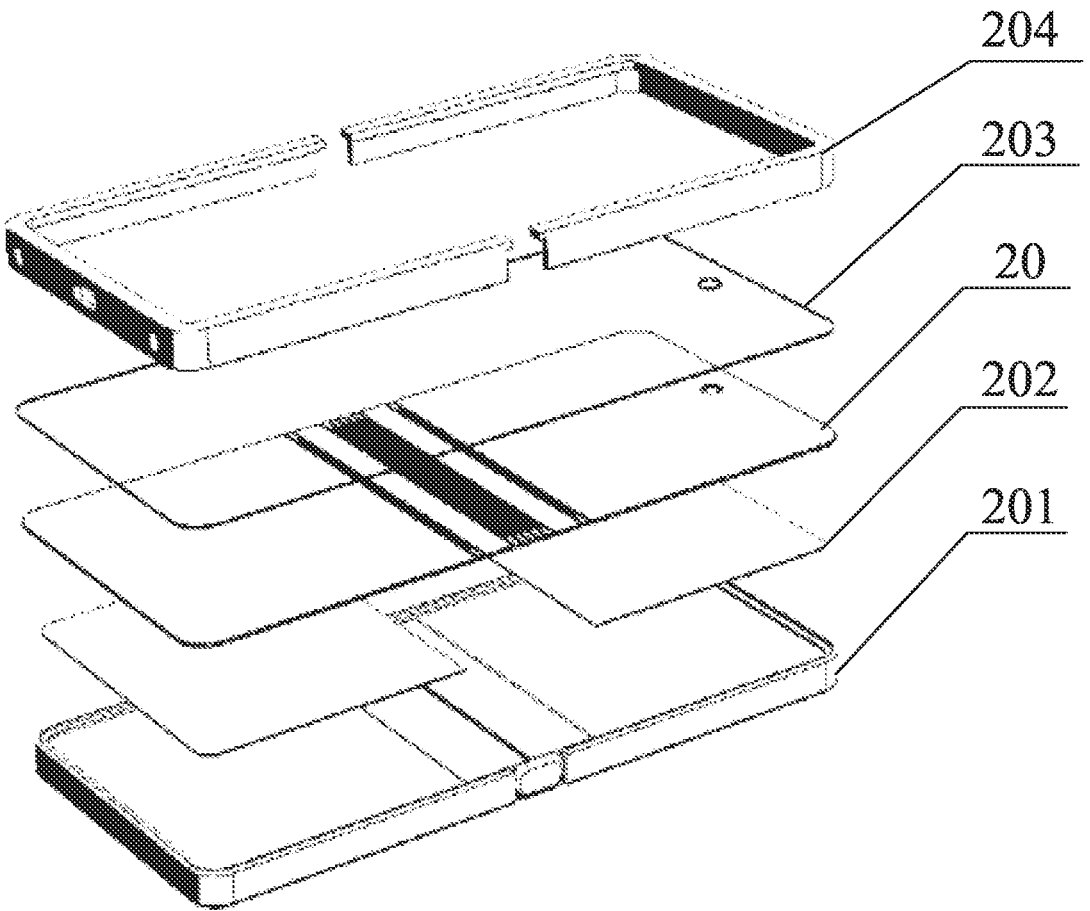

FIG. 10 is a schematic structural diagram of a water drop-shaped folding mobile phone provided by an embodiment of the application.

Figure 11:
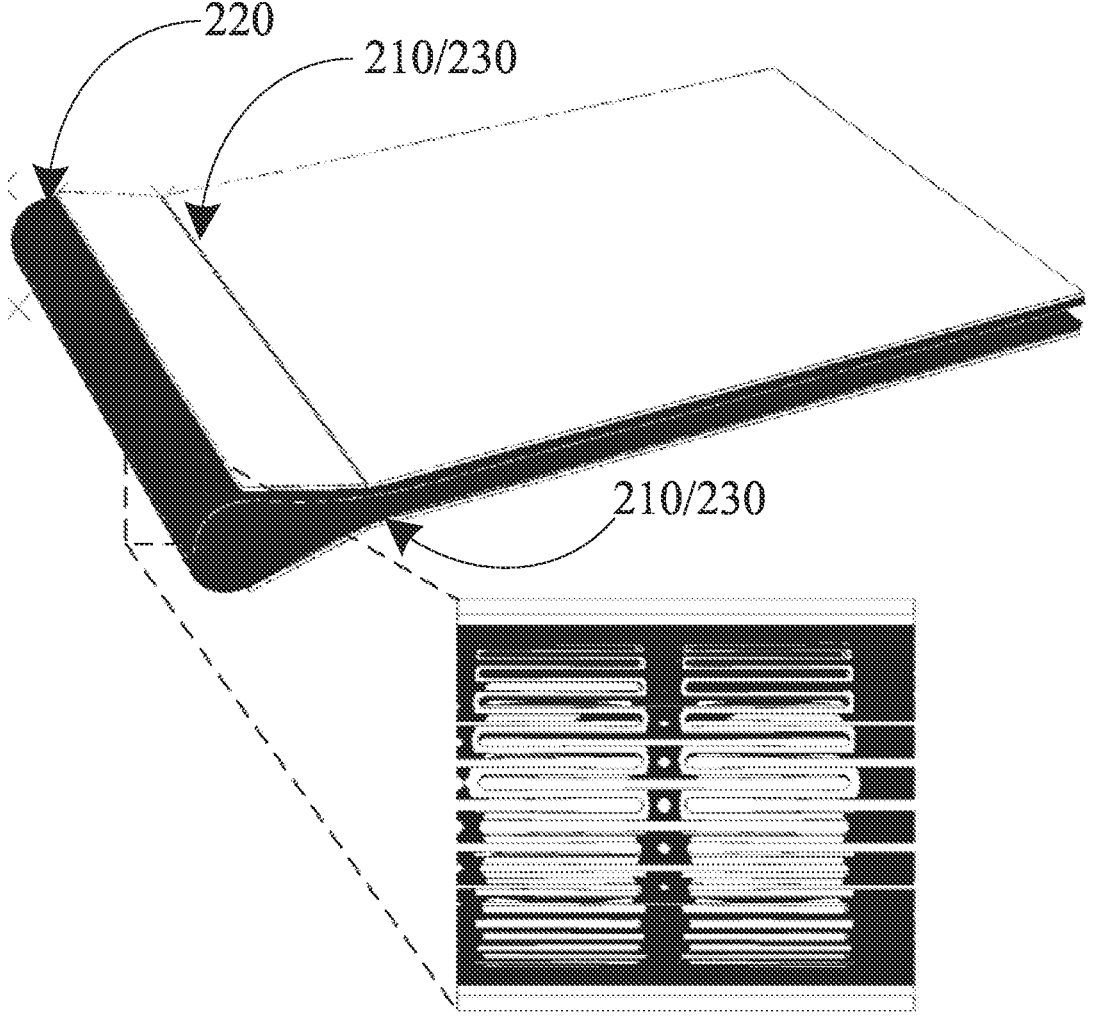

FIG. 11 is a schematic diagram of stress distribution when the water drop-shaped folding mobile phone is bent according to an embodiment of the application.

EMBODIMENTS OF INVENTION

Description of Specific Embodiments of the Invention

In order to make the purpose, technical solutions, and effects of this application clearer, the following further describes this application in detail with reference to the drawings and embodiments. It should be understood that the specific embodiments described here are only used to explain the application, and not used to limit the application.

Please refer to FIG. 1 to FIG. 4. This embodiment provides a support structure 20, and the support structure 20 is provided with a bending area 200. The bending area 200 is provided with a plurality of rows of first strip hollow structures 260, and at least one first strip hollow structure 260 in the same row is arranged along its length direction. That is, the first strip hollow structures 260 positioned in the same row are aligned. For example, the centerlines of the first strip hollow structures 260 in the same row are overlapped with each other or adjacent to each other along the length direction; wherein, the length direction is different from the bending direction. Specifically, the bending direction is substantially perpendicular to the length direction. Further, a circular hollow structure 250 is provided between two adjacent first strip hollow structures 260 in the same row, and the circular hollow structure 250 is positioned between the other two adjacent first strip hollow structures 260 in adjacent rows.

It should be noted that by reasonably providing a corresponding strip hollow structure and circular hollow structure 250 in the bending area 200, the concentrated local stress can be dispersed, the bending performance of the support structure 20 can be improved, and it is able to adapt to different bending radii. In addition, the ductility is improved, which can effectively reduce or eliminate the local fracture phenomenon of the support structure 20 during the bending process.

Wherein, the preparation material of the support structure 20 in this embodiment may include but is not limited to at least one of manganese, aluminum, or magnesium.

As shown in FIG. 2, the first strip hollow structure 260 includes a first semicircular hollow substructure 261, a first elongated hollow substructure 262, and a second semicircular hollow substructure 263 sequentially arranged in a length direction of the first strip hollow structure 260; and the first elongated hollow substructure 262 is connected to the first semicircular hollow substructure 261 and the second semicircular hollow substructure 263.

In the length direction, the circular hollow structure 250 is positioned between adjacent first semicircular hollow substructures 261 and/or second semicircular hollow substructures 263; and in the bending direction, the circular hollow structure 250 is positioned between two adjacent first elongated hollow substructures 262 in adjacent rows.

As shown in FIG. 3 and FIG. 4, a radius of the circular hollow structure 250 is equal to a radius of the first semicircular hollow substructure 261 or a radius of the second semicircular hollow substructure 263, and a width of the first elongated hollow substructure 262 is equal to a diameter of the circular hollow structure 250.

As shown in FIG. 1, in one embodiment, the bending area 200 includes a first bendable sub-area 210, a second bendable sub-area 220, and a third bendable sub-area 230 arranged at intervals along the bending direction. In this embodiment, each of the bendable sub-areas is spaced by a corresponding non-bending area 100, and the non-bending areas 100 are symmetrically provided on both sides of the bending area 200 along the bending direction, or the non-bending areas 100 provided on both sides of the bending area 200 along the bending direction are symmetrically distributed based on a centerline of the support structure 20. Moreover, a width of the second bendable sub-area 220 along the bending direction is greater than a sum of a width of the first bendable sub-area 210 along the bending direction and a width of the third bendable sub-area 230 along the bending direction.

Wherein, an interval distance from the second bendable sub-area 220 to the first bendable sub-area 210 may, but not limited to, equal to an interval distance from the second bendable sub-area 220 to the third bendable sub-area 230.

Wherein, an interval distance from the second bendable sub-area 220 to the first bendable sub-area 210 or the third bendable sub-area 230 is greater than a distance between two adjacent first strip hollow structures 260 in the bending direction.

It can be understood that the provision of multiple corresponding sub-bending areas in the bending area 200 can further adapt to a smaller bending radius while meeting the requirements for the bending shape.

As shown in FIG. 2, in one of the embodiments, the support structure 20 further includes a second strip hollow structure 270, and the second strip hollow structure 270 penetrates an edge and/or a side surface of the bending area 200. It is understandable that the second strip hollow structure 270 can further increase the ductility of the edge area of the support structure and can disperse the stress concentrated in the non-edge area.

As shown in FIG. 2, in one of the embodiments, a circular hollow structure 250 is provided between the first strip hollow structure 260 and the second strip hollow structure 270 in the same row. It should be noted that the first strip hollow structures 260 are arranged row by row, and the second strip hollow structures 270 are arranged alternately. The second strip hollow structures 270 arranged alternately can not only improve their ductility but also ensure that the support structure 20 has a corresponding rigidity.

As shown in FIG. 2, it should be noted that the second strip hollow structure 270 includes a third semicircular hollow substructure 271 and a second elongated hollow substructure 272 that are connected; wherein a width of the second elongated hollow substructure 272 is equal to a width of the first elongated hollow substructure 262, a length of the second elongated hollow substructure 272 is less than or equal to a length of the first elongated hollow substructure 262, and a radius of the third semicircular hollow substructure 271 is equal to a radius of the circular hollow structure 250.

As shown in FIG. 5, in one of the embodiments, as the length L of the first elongated hollow substructure 262 increases, the local peak stress that the support structure 20 bears during the bending process gradually decreases. The length L of the first elongated hollow substructure 262 can be selected in a range from 3 mm to 5.7 mm. When the length L of the first elongated hollow substructure 262 is 3 mm, the corresponding local peak stress is about 1100 MPa. When the length L of the first elongated hollow substructure 262 is 3.7 mm, the corresponding local peak stress is about 810 MPa. When the length L of the first elongated hollow substructure 262 is 4.2 mm, the corresponding local peak stress is about 780 MPa. When the length L of the first elongated hollow substructure 262 is 4.7 mm, the corresponding local peak stress is about 700 MPa. When the length L of the first elongated hollow substructure 262 is 5.2 mm, the corresponding local peak stress is about 600 MPa. When the length L of the first elongated hollow substructure 262 is 5.7 mm, the corresponding local peak stress is about 520 MPa. Therefore, considering the optimization of the local peak stress, the length L of the first elongated hollow substructure 262 can be selected to be greater than or equal to 3 mm. The length L of the corresponding first elongated hollow substructure 262 can also be selected according to the magnitude of the local peak stress that the support structure 20 can adapt to.

It should be noted that the trend chart corresponding to the above simulation data is based on that the distance X between the circular hollow structure 250 and the adjacent first semicircular hollow substructure 261 or the second semicircular hollow substructure 263 is 0.16 mm, the distance Y between two adjacent first elongated hollow substructures 262 in the bending direction is 0.08 mm, and the radius R of the circular hollow structure 250 is 0.1 mm.

As shown in FIG. 6, in one of the embodiments, as the distance X between the circular hollow structure 250 and the adjacent first semicircular hollow substructure 261 or the second semicircular hollow substructure 263 changes from 100 μm to 240 μm, the local peak stress first drops and then rises. It is indicated that the distance X between the circular hollow structure 250 and the adjacent first semicircular hollow substructure 261 or the second semicircular hollow substructure 263 has a better selection range, which is not that the greater the better, nor the less the better. Wherein, the distance X between the circular hollow structure 250 and the adjacent first semicircular hollow substructure 261 or the second semicircular hollow substructure 263 sequentially increases from 100 μm, 120 μm, 140 μm to 160 μm, the local peak stress drops from about 900 MPa to about 600 MPa. As the distance X between the circular hollow structure 250 and the adjacent first semicircular hollow substructure 261 or the second semicircular hollow substructure 263 sequentially increases from 160 μm, 180 μm, 200 μm, 220 μm to 240 μm, the local peak stress rises from about 600 MPa to about 950

MPa. Therefore, as a better choice, the distance X between the circular hollow structure 250 and the adjacent first semicircular hollow substructure 261 or the second semicircular hollow substructure 263 can be selected in a range from 120 µm to 180 µm. Of course, as a better solution to weaken the local peak stress, it can also be selected at about 160 µm.

It should be noted that the trend chart corresponding to the above simulation data is based on that the length L of the first elongated hollow substructure 262 is 4.2 mm, the distance Y between two adjacent first elongated hollow substructures 262 in the bending direction is 0.08 mm, and the radius R of the circular hollow structure 250 is 0.1 mm.

As shown in FIG. 7, in one of the embodiments, as the distance Y between two adjacent first elongated hollow substructures 262 in the bending direction increases from 60 µm to 140 µm, the local peak stress first decreases and then increases. It is indicated that the distance Y between the two adjacent first elongated hollow substructures 262 in the bending direction has a better selection range, which is not the greater the better, nor the less the better. Wherein, as the distance Y between two adjacent first elongated hollow substructures 262 in the bending direction increases from 60 µm to 80 µm, the local peak stress decreases from about 800 MPa to close to 600 MPa; and as the distance Y between two adjacent first elongated hollow substructures 262 in the bending direction increases from 80 µm, 100 µm, and 120 µm to 140 µm, the local peak stress rises from approximately 600 MPa to about 1300 MPa. Therefore, as a better choice, the distance Y between two adjacent first elongated hollow substructures 262 in the bending direction can be selected in a range from 60 µm to 100 µm. Of course, as a better solution to weaken the local peak stress, it can be around 80 µm.

It should be noted that the trend chart corresponding to the above simulation data is based on that the length L of the first elongated hollow substructure 262 is 4.2 mm, the distance X between the circular hollow structure 250 and the adjacent first semicircular hollow substructure 261 or second semicircular hollow substructure 263 is 0.16 mm, and the radius R of the circular hollow structure 250 is 0.1 mm.

As shown in FIG. 8, in one of the embodiments, as the radius R of the circular hollow structure 250 increases from 60 µm, 75 µm, 100 µm, 110 µm, 125 µm to 150 µm, the local peak stress rises from about 400 MPa to about 1650 MPa. It is indicated that the smaller the radius R of the circular hollow structure 250, the better. Therefore, as a better choice, the radius R of the circular hollow structure 250 can be selected within a range less than or equal to 120 µm. Of course, as a better solution to weaken the local peak stress, it can also be selected to be about 100 µm.

It should be noted that the trend chart corresponding to the above simulation data is based on that the length L of the first elongated hollow substructure 262 is 4.2 mm, the distance X between the circular hollow structure 250 and the adjacent first semicircular hollow substructure 261 or the second semicircular hollow substructure 263 is 0.16 mm, and the distance Y between two adjacent first elongated hollow substructures 262 in the bending direction is 0.08 mm.

It should be noted that the first strip hollow structure 260, the circular hollow structure 250, and the second strip hollow structure 270 are all formed by etching. It is also required that there should be no foreign material, oil stains, and defects after the process, and the bending area 200 should be kept flat after forming, with a good appearance, and ensure that there is no side etching and over-etching phenomenon, so as to ensure that the uniformity of the respective dimensions of the first strip hollow structure 260, the circular hollow structure 250, and the second strip hollow structure 270 is ensured. In addition, it is required that the horizontal and vertical intervals corresponding to the first strip hollow structure 260, the circular hollow structure 250, and the second strip hollow structure 270 are uniform and have no burrs, micro-cracks, etc. at their edges. Through the arrangement of the first strip hollow structure 260, the circular hollow structure 250, and the second strip hollow structure 270, and providing them alternately and periodically arranged in the bending area 200, the local elastic modulus of the bending area 200 can be reduced, and the local extensibility of the support layer can be improved.

To sum up, take the fatigue bending fracture limit value of 800 MPa for the material selection of the support structure 20 as the reference value of the optimized selection target and consider the feasibility of the process. It is ensured that the optimal size value and the optimal range value of the optimal substructure of the support structure 20 can be determined as follows: 4.2 mm≤the length L of the first elongated hollow substructure 262≤5.2 mm, the distance X between the circular hollow structure 250 and the adjacent first semicircular hollow substructure 261 or the second semicircular hollow substructure 263 is 0.16 mm, the distance Y between two adjacent first elongated hollow substructures 262 in the bending direction is 0.8 mm, and the radius R of the circular hollow structure 250 is less than or equal to 0.1 mm.

As shown in FIG. 9, in one of the embodiments, the present application provides a flexible display panel, which includes the support structure 20 in any of the foregoing embodiments. Wherein, the tensile breaking strength of the support structure 20 is greater than or equal to 1600 MPa; and the surface flatness of the support structure 20 is less than or equal to 0.25 mm.

In one of the embodiments, the flexible display panel further includes a protective film layer 10, the protective film layer 10 is positioned on one side of the support structure 20 away from the flexible substrate 40, and the protective film layer 10 covers at least the bending area 200. The protective film layer 10 is a linear elastic material.

In one of the embodiments, the flexible display panel further includes a buffer layer 30. The buffer layer 30 is positioned between the flexible substrate 40 and the support structure 20, and the buffer layer 30 is made of a superelastic material, which has good energy absorption and buffering effect.

In one of the embodiments, the flexible display panel further includes a display device layer 50, a polarizer 60, an optical adhesive layer 70, and a protective cover 80 which are positioned on the other side of the flexible substrate 40 and are sequentially stacked.

Wherein, the flexible display panel is also provided with at least one circular hole 90. The circular hole 90 penetrates the protective film layer 10, the support structure 20, the buffer layer 30, the flexible substrate 40, the display device layer 50, the polarizer 60, the optical adhesive layer 70, and the protective cover 80. The circular hole 90 is disposed in the non-bending area 100 of the support structure 20. It can be understood that the circular hole 90 can be, but is not limited to, a camera hole.

It should be noted that the elastic modulus of the protective film layer 10, the buffer layer 30, the flexible substrate 40, the polarizer 60, the optical adhesive layer 70, and the protective cover 80 are relatively low. It has good bendability, and the optical adhesive layer 70 is a typical viscoelastic transparent material. The protective cover 80, the polarizer 60, and the flexible substrate 40 are all linear elastic materials.

As described above, the above-mentioned support structure 20 and flexible display panel in the present application can be, but not limited to, applied in the field of foldable display, and can also be applied in the fields of roll-up display, large-screen display, expandable display fields, as well as tablet phones, flexible foldable phones, full-screen phones, tablet computers, rollable phones, or rollable tablet computers. They can also be applied to various electronic display devices, which can improve the ductility of the bending area 200 of the metal support structure 20 so that the local tensile modulus of the original full-surface support plate structure is effectively reduced, and the characteristics of coordinated deformation of the optical adhesive layer bonded to it during the bending process can be achieved. In addition, this application adopts a design of shape optimization and size optimization to rationally design the above-mentioned periodic special combined hole substructure, and combine the optimization verification method of simulation design to determine the optimal structure size of the hole substructure. In this way, the stress concentration phenomenon is reduced, and the risk of fracture failure of the support structure 20 caused by excessive local stress during the bending process is reduced. Through the implementation of this application, the yield of flexible folding screen modules can be improved, and reasonable and effective design methods and solutions can be provided for reference.

In one of the embodiments, the present application provides an electronic device, which includes the support structure 20 in any of the above embodiments.

The electronic device can be a variety of devices with a display function with a small bending radius. For example, it can be, but not limited to, a mobile phone with a wedge-shaped structure, or a flexible foldable mobile phone with a drop-shaped structure.

As shown in FIG. 10, the flexible water drop type foldable mobile phone includes a support structure 20 or a flexible display panel in any of the above embodiments, a frame 201 disposed on one side of the support structure 20, a support plate 202 positioned between the support structure 20 and the frame 201, a front frame 204 disposed on the other side of the support structure 20, and a display module 203 positioned between the support structure 20 and the front frame 204.

As shown in FIG. 11, during the folding process of a foldable mobile phone with a flexible drop-shaped/wedge-shaped bending structure, the stress is concentrated at a position shown by the dashed frame in the figure, and local breakage is likely to occur. By reasonably dispersing the stresses of the corresponding bendable sub-areas, the first strip hollow structure 260, the circular hollow structure 250, and the second strip hollow structure 270 in each bendable sub-area, the stress in the concentrated area is dispersed. It greatly reduces or eliminates the risk of film breakage and debonding between film layers. In addition, for folding mobile phones with flexible drop-shaped/wedge-shaped bendable structures, compared with the outward bending, the hollow structures designed in the present disclosure have a better stress dispersion effect when they are bent inward as shown in FIG. 11, and are also more conducive to preventing local fracture, film layer fracture, and the unfavorable phenomenon of debonding between film layers. Moreover, for foldable mobile phones with flexible drop-shaped/wedge-shaped bendable structures, a width of the second bendable sub-area 220 in the bending direction is designed to be greater than a sum of a width of the first bendable sub-area 210 in the bending direction and a width of the third bendable sub-area 230 in the bending direction. This design is conducive to realize that the bending area of the foldable mobile phone presents a rounder arc-shaped appearance, and is conducive to being able to withstand higher external force extrusion without cracking or damage.

It can be understood that, for those of ordinary skill in the art, equivalent replacements or modifications can be made according to the technical solution of the present application and its inventive concept, and all these modifications or replacements shall fall within the protection scope of the claims of the present application.

What is claimed is:

1. A support structure, comprising a bending area, wherein the bending area is provided with a plurality of rows of first strip hollow structures along a bending direction; a circular hollow structure is provided between two adjacent first strip hollow structures in a same row, and the circular hollow structure is positioned between other two adjacent first strip hollow structures in adjacent rows, wherein the bending area comprises a first bendable sub-area, a second bendable sub-area, and a third bendable sub-area arranged at intervals along the bending direction; a width of the second bendable sub-area along the bending direction is greater than a sum of a width of the first bendable sub-area along the bending direction and a width of the third bendable sub-area along the bending direction.

2. The support structure according to claim 1, wherein the support structure further comprises a second strip hollow structure; the second strip hollow structure penetrates an edge and/or a side surface of the bending area.

3. The support structure according to claim 2, wherein the circular hollow structure is arranged between the first strip hollow structure and the second strip hollow structure positioned in a same row.

4. The support structure according to claim 1, wherein the first strip hollow structure comprises a first semicircular hollow substructure, a first elongated hollow substructure, and a second semicircular hollow substructure sequentially arranged in a length direction of the first strip hollow structure; and the first elongated hollow substructure is connected to the first semicircular hollow substructure and the second semicircular hollow substructure.

5. The support structure according to claim 4, wherein in the length direction, the circular hollow structure is positioned between adjacent first semicircular hollow substructures and/or adjacent second semicircular hollow substructures; and in the bending direction, the circular hollow structure is positioned between two adjacent first elongated hollow substructures in adjacent rows.

6. The support structure according to claim 4, wherein a radius of the circular hollow structure is equal to a radius of the first semicircular hollow substructure or a radius of the second semicircular hollow substructure.

7. The support structure according to claim 6, wherein a width of the first elongated hollow substructure is equal to a diameter of the circular hollow structure.

8. The support structure according to claim 4, wherein the support structure comprises at least one of a first sub-feature, a second sub-feature, a third sub-feature, or a fourth sub-feature;

wherein, the first sub-feature is that in the length direction, a distance between the circular hollow structure and an adjacent first semicircular hollow substructure or the second semicircular hollow substructure ranges from 0.1 mm to 0.24 mm; the second sub-feature is that in the bending direction, a distance between two adjacent first elongated hollow sub-structures ranges from 0.06 mm to 0.14 mm; the third sub-feature is that a length of the first elongated hollow substructure is greater than or equal to 3 mm; and the fourth sub-feature is that a radius of the circular hollow structure is less than or equal to 0.1 mm.

9. The support structure according to claim 1, wherein a preparation material of the support structure comprises at least one of manganese, aluminum, or magnesium.

10. The support structure according to claim 1, wherein an interval distance from the second bendable sub-area to the first bendable sub-area or the third bendable sub-area is greater than a distance between two adjacent first strip hollow structures in the bending direction.

11. The support structure according to claim 1, wherein an interval distance from the second bendable sub-area to the first bendable sub-area is equal to an interval distance from the second bendable sub-area to the third bendable sub-area.

12. A flexible display panel, comprising a support structure, wherein the support structure comprises a bending area, the bending area is provided with a plurality of rows of first strip hollow structures along a bending direction; a circular hollow structure is provided between two adjacent first strip hollow structures in a same row, and the circular hollow structure is positioned between other two adjacent first strip hollow structures in adjacent rows, wherein the bending area comprises a first bendable sub-area, a second bendable sub-area, and a third bendable sub-area arranged at intervals along the bending direction; a width of the second bendable sub-area along the bending direction is greater than a sum of a width of the first bendable sub-area along the bending direction and a width of the third bendable sub-area along the bending direction.

13. The flexible display panel according to claim 12, wherein a tensile breaking strength of the support structure is greater than or equal to 800 MPa; and a surface flatness of the support structure is less than or equal to 0.25 mm.

14. The flexible display panel according to claim 13, wherein the support structure further comprises a second strip hollow structure; and the second strip hollow structure penetrates an edge and/or a side surface of the bending area.

15. The flexible display panel according to claim 14, wherein the circular hollow structure is arranged between the first strip hollow structure and the second strip hollow structure positioned in a same row.

16. The flexible display panel according to claim 13, wherein the first strip hollow structure comprises a first semicircular hollow substructure, a first elongated hollow substructure, and a second semicircular hollow substructure sequentially arranged in a length direction of the first strip hollow structure; and the first elongated hollow substructure is tangentially connected to the first semicircular hollow substructure and the second semicircular hollow substructure.

17. The flexible display panel according to claim 16, wherein in the length direction, the circular hollow structure is positioned between adjacent first semicircular hollow substructures and/or adjacent second semicircular hollow substructures; and in the bending direction, the circular hollow structure is positioned between two adjacent first elongated hollow substructures in adjacent rows.

18. The flexible display panel according to claim 16, wherein the support structure comprises at least one of a first sub-feature, a second sub-feature, a third sub-feature, or a fourth sub-feature; and wherein, the first sub-feature is that in the length direction, a distance between the circular hollow structure and an adjacent first semicircular hollow substructure or the second semicircular hollow substructure ranges from 0.1 mm to 0.24 mm; the second sub-feature is that in the bending direction, a distance between two adjacent first elongated hollow sub-structures ranges from 0.06 mm to 0.14 mm; the third sub-feature is that a length of the first elongated hollow substructure is greater than or equal to 3 mm; and the fourth sub-feature is that a radius of the circular hollow structure is less than or equal to 0.1 mm.

19. An electronic device, comprising a flexible display panel, the flexible display panel comprising a support structure, wherein the support structure comprises a bending area, the bending area is provided with a plurality of rows of first strip hollow structures along a bending direction; a circular hollow structure is provided between two adjacent first strip hollow structures in a same row, and the circular hollow structure is positioned between other two adjacent first strip hollow structures in adjacent rows, wherein the bending area comprises a first bendable sub-area, a second bendable sub-area, and a third bendable sub-area arranged at intervals along the bending direction; a width of the second bendable sub-area along the bending direction is greater than a sum of a width of the first bendable sub-area along the bending direction and a width of the third bendable sub-area along the bending direction.

* * * * *